US011912891B2

(12) United States Patent
Greenwood et al.

(10) Patent No.: US 11,912,891 B2
(45) Date of Patent: Feb. 27, 2024

(54) COATINGS WITH SOLAR REFLECTIVE PROPERTIES

(71) Applicant: NOURYON CHEMICALS INTERNATIONAL B.V., Arnhem (NL)

(72) Inventors: Peter Harry Johan Greenwood, Gothenburg (SE); Jonathan Carl Slepsky, Marietta, GA (US); Jan Nordin, Kvissleby (SE); Olof Sandin, Sundsvall (SE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 738 days.

(21) Appl. No.: 16/982,130

(22) PCT Filed: Mar. 19, 2019

(86) PCT No.: PCT/EP2019/056763
§ 371 (c)(1),
(2) Date: Sep. 18, 2020

(87) PCT Pub. No.: WO2019/179974
PCT Pub. Date: Sep. 26, 2019

(65) Prior Publication Data
US 2021/0071010 A1    Mar. 11, 2021

Related U.S. Application Data

(60) Provisional application No. 62/645,920, filed on Mar. 21, 2018.

(30) Foreign Application Priority Data

Apr. 10, 2018  (EP) .................................. 18166553

(51) Int. Cl.
| C09D 5/33 | (2006.01) |
| C09D 7/40 | (2018.01) |
| C09D 7/62 | (2018.01) |
| C09D 201/00 | (2006.01) |
| C08K 3/36 | (2006.01) |
| C08K 7/26 | (2006.01) |
| C08K 9/06 | (2006.01) |

(52) U.S. Cl.
CPC ............... *C09D 5/004* (2013.01); *C09D 7/62* (2018.01); *C09D 7/67* (2018.01); *C09D 7/70* (2018.01); *C09D 201/00* (2013.01); *C08K 3/36* (2013.01); *C08K 7/26* (2013.01); *C08K 9/06* (2013.01); *C08K 2201/006* (2013.01)

(58) Field of Classification Search
None
See application file for complete search history.

(56) References Cited

U.S. PATENT DOCUMENTS

| 2,630,410 | A | 3/1953 | Clapsadle |
| 4,927,749 | A | 5/1990 | Dorn |
| 4,927,750 | A | 5/1990 | Dorn |
| 5,368,833 | A | 11/1994 | Johansson et al. |
| 5,574,127 | A | 11/1996 | Sau |
| 6,162,877 | A | 12/2000 | Sau |
| 6,214,450 | B1 | 4/2001 | Wickert et al. |
| 8,287,998 | B2 | 10/2012 | Skelhorn |
| 9,540,803 | B2 | 1/2017 | Casimiro et al. |
| 11,111,393 | B2 | 9/2021 | Muroi |
| 2005/0126441 | A1 | 6/2005 | Skelhorn |
| 2007/0082190 | A1 | 4/2007 | Endres et al. |
| 2010/0104809 | A1 | 4/2010 | Duda et al. |

(Continued)

FOREIGN PATENT DOCUMENTS

| CN | 101250343 A | 8/2008 |
| CN | 102399483 A | 4/2012 |

(Continued)

OTHER PUBLICATIONS

EPO, Extended Search Report issued in EP Application No. 18166553. 0, dated Jul. 4, 2018.
EPO, International Search Report issued in International Application No. PCT/EP2019/056763 dated Apr. 17, 2019.
Database WPI, Week 201523, Thomson Scientific, London, GB; AN 2015-18817K, XP002781785, -& CN 104 312 337 A (Hefei Bulaochuanqi Heal Th Sci & Technolo) Jan. 28, 2015 (Jan. 28, 2015).
Database WPI, Week 201815, Thomson Scientific, London, GB; AN 2018-08589E XP002781784, -& CN 107 603 360 A (Wuhu Shuangbao Building Materials Co Ltd) Jan. 19, 2018 (Jan. 19, 2018).

(Continued)

*Primary Examiner* — Colin W. Slifka
*Assistant Examiner* — Michael Forrest
(74) *Attorney, Agent, or Firm* — LORENZ & KOPF, LLP

(57) ABSTRACT

The present disclosure relates to a coating composition, in particular a cool roof or solar reflective coating composition, which comprises an organosilane-functionalised colloidal silica and hollow microspheres, wherein the organosilane-functionalised colloidal silica comprises silica particles with one or more organosilane moieties bound to their surface, and wherein the hollow microspheres comprise a polymeric shell. The present disclosure also relates to substrate coated with the coating composition, and to a method for making such a coating composition. The present disclosure further relates to the use of an organosilane-functionalised colloidal silica and/or hollow microspheres in a cool roof or solar reflective coating composition, for improving properties such as the coating lifetime and ageing characteristics, the storage stability, the tensile strength, the reflectance of radiation over the range of about 280 to 2500 nm, the wet and/or dry adherence, and the dirt pick-up resistance to hydrophilic and/or hydrophobic materials.

20 Claims, No Drawings

(56) References Cited

U.S. PATENT DOCUMENTS

| | | | | |
|---|---|---|---|---|
| 2012/0121886 A1* | 5/2012 | Huang | ............... | C09D 7/69 428/313.5 |
| 2014/0112963 A1 | 4/2014 | Phillip et al. | | |
| 2015/0176267 A1 | 6/2015 | Casimiro et al. | | |

FOREIGN PATENT DOCUMENTS

| | | |
|---|---|---|
| CN | 104312337 A | 1/2015 |
| CN | 104449171 A | 3/2015 |
| CN | 105778689 A | 7/2016 |
| CN | 107603360 A | 1/2018 |
| CN | 107699078 A | 2/2018 |
| EP | 1094091 A1 | 4/2001 |
| EP | 1408097 A1 | 4/2004 |
| EP | 3257909 B1 | 11/2020 |
| JP | H0657893 A | 3/1994 |
| JP | 2006232971 A | 9/2006 |
| JP | 2007512217 A | 5/2007 |
| JP | 2007190732 A | 8/2007 |
| JP | 2007262350 A | 10/2007 |
| JP | 2009279862 A | 12/2009 |
| JP | 2010202728 A | 9/2010 |
| JP | 2014218786 A | 11/2014 |
| JP | 2015147863 A | 8/2015 |
| JP | 2018028015 A | 2/2018 |
| KR | 101683739 B1 | 12/2016 |
| WO | 03037989 A1 | 5/2003 |
| WO | 2004035473 A1 | 4/2004 |
| WO | 2004035474 A1 | 4/2004 |
| WO | 2007073318 A1 | 6/2007 |
| WO | 2008057029 A1 | 5/2008 |
| WO | 2011054774 A1 | 5/2011 |
| WO | 2012130763 A1 | 10/2012 |
| WO | 2013167501 A1 | 11/2013 |
| WO | 2016012358 A1 | 1/2016 |
| WO | 2016129340 A1 | 8/2016 |
| WO | 2017099171 A1 | 6/2017 |
| WO | 2018011182 A1 | 1/2018 |

OTHER PUBLICATIONS

Database WPI, Week 201819, Thomson Scientific, London, GB; AN 2018-15431L, XP002781786, -& CN 107 699 078 A (Guangdong Huazibu New Materials Technolo) Feb. 16, 2018 (Feb. 16, 2018).

Greenwood, P., "Aqueous silane modified silica sols: theory and preparation", Pigment and Resin Technology, Sep. 2011, vol. 40, No. 5, pp. 275-284.

Sears, G.W. Jr., "Determination of specific surface area of colloidal silica by titration with sodium hydroxide", Analytical Chemistry, 1956, pp. 1981-1983, vol. 28, No. 12.

Iler, R.K., et al. "Degree of hydration of particles of colloidal silica in aqueous solution", Journal of Physical Chemistry, 1956, pp. 955-957, vol. 60, No. 7.

Iler, R.K., "The Chemistry of Silica. Solubility, Polymerization, Colloid and Surface Properties, and Biochemistry", 1979, Chapter 5, p. 465, John Wiley and Sons.

Iler, R.K., "The Chemistry of Silica. Solubility, Polymerization, Colloid and Surface Properties, and Biochemistry", 1979, Chapter 4, p. 407-409, John Wiley and Sons.

* cited by examiner

COATINGS WITH SOLAR REFLECTIVE PROPERTIES

CROSS-REFERENCE TO RELATED APPLICATION

This application is a U.S. National-Stage entry under 35 U.S.C. § 371 based on International Application No. PCT/EP2019/056763, filed Mar. 19, 2019, which was published under PCT Article 21(2) and which claims priority to European Application No. 18166553.0, filed Apr. 10, 2018, and U.S. Provisional Application No. 62/645,920, filed Mar. 21, 2018, which are all hereby incorporated in their entirety by reference.

TECHNICAL FIELD

The present disclosure relates to compositions that have solar reflective properties, and which can be used, for example, as a "cool roof" coating on buildings. The disclosure also relates to the use of organosilane-modified colloidal silica for improving properties of a solar reflective coating composition.

BACKGROUND ART

Reflective coatings are often applied to structures such as buildings to help improve energy efficiency, typically by reducing the load on air conditioning units. A well-known type of coating is the so-called "cool roof" coating, which has high solar reflectance properties that help to reduce heat build-up.

Examples of compositions that have solar reflective properties include those described in CN102399483, CN104449171, CN105778689, U.S. Pat. Nos. 6,214,450, 8,287,998 and 9,540,803. Silica and/or microspheres, such as glass or polymeric microspheres, can also be constituents of such coatings.

Colloidal silica has also been used as a constituent of coating compositions, including colloidal silica that has been modified with organosilane groups, as described for example in CN107603360, WO2004/035474, WO2008/057029, WO2011/054774, WO2012/130763 and WO2013/167501.

There remains a need for solar reflective compositions that have improved properties.

BRIEF SUMMARY

This disclosure provides a coating composition comprising an organosilane-functionalised colloidal silica and hollow microspheres, wherein the organosilane-functionalised colloidal silica comprises silica particles with one or more organosilane moieties bound to their surface, and wherein the hollow microspheres comprise a polymeric shell.

This disclosure also provides a method of making a coating composition, comprising mixing an organosilane-functionalised colloidal silica, hollow microspheres and optionally one or more organic binders and/or pigments, wherein the coating composition is as described above.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description The disclosure is directed towards a solar reflective coating composition comprising an organosilane-functionalised colloidal silica and polymeric hollow microspheres.

The disclosure is also directed towards the use of an organosilane-functionalised colloidal silica and/or polymeric hollow microspheres as components of a solar reflective or cool roof coating composition for improving certain properties of the coating.

In one aspect, the organosilane-functionalised colloidal silica and/or hollow microspheres can be used for increasing one or more of the following properties: storage stability, the reflectance of radiation over the wavelength range of about 280 to about 2500 nm, and the wet adherence of a solar reflective coating composition or a cool roof coating composition.

In another aspect, the organosilane-functionalised colloidal silica and optionally hollow microspheres can be used in a solar reflective coating composition or a cool roof coating composition, for improving one or more of the following properties: tear resistance, the tensile strength, the dry adherence, and the dirt pick-up resistance to hydrophilic and/or hydrophobic materials.

In a further aspect, the hollow microspheres and optionally an organosilane-functionalised colloidal silica can be used in a solar reflective coating composition or a cool roof coating composition, for improving the coating lifetime and ageing characteristics.

The organosilane-functionalised colloidal silica comprises silica particles with one or more organosilane moieties bound to their surface, and the hollow microspheres comprise a polymeric shell.

DESCRIPTION OF EMBODIMENTS

The following detailed description is merely exemplary in nature and is not intended to limit the disclosure or the application and uses of the disclosure. Furthermore, there is no intention to be bound by any theory presented in the preceding background of the disclosure or the following detailed description.

The solar reflective coating compositions comprise at least one organosilane-functionalised colloidal silica, as described in more detail below. The coating composition also comprises other components that make it suitable for application to a suitable surface, typically a building roof or wall, and usually on an external surface.

Polymeric microspheres can also be a constituent of the solar reflective coating compositions. These are described in more detail below.

Organosilane-Functionalised Colloidal Silica

The organosilane-functionalised colloidal silica can be made by conventional processes, as described for example in WO 2004/035473.

Typically, the organosilane-functionalised colloidal silica is formed from a reaction between one or more organosilane reactants, which can be expressed generally by the formula T4-ySi-[R1]y, and one or more silanol groups on the silica surface, i.e. [SiO2]—OH groups. The result is a silica surface comprising one or more organosilane moieties attached to the surface.

In the organosilane reactant, each T is typically independently selected from C1-6 alkoxy, C1-6 haloalkoxy, hydroxy and halide. Other options are the use of siloxanes, e.g. of formula [R1]bT3-bSi{—O-SiT2-c[R1]c}a-O-SiT3-b[R1]b where a is about 0 or an integer of about 1 or more, typically from about 0 to about 5, b is from about 1 to about 3, and c is from about 1 to about 2. Other examples include disilazanes, of formula {[R1]bT3-bS}2-NH where b is from about 1 to about 3. Of the haloalkoxy groups, fluoro and chloro are preferred halo substituents. Alkoxy groups and halides are often preferred as the T species. Of the halides, chloride is a suitable choice. Of the alkoxy groups, C1-4 alkoxy groups, such as methoxy, ethoxy, propoxy or iso-propoxy, are suitable choices. In embodiments, the organosilane reactant can undergo a prehydrolysis step, in which one or more T groups are converted to —OH, as described for example by Greenwood and Gevert, Pigment and Resin Technology, 2011, 40(5), pp 275-284.

The organosilane reactant can react with a surface silanol group to form from one to three Si—O—Si links between the silica surface and the organosilane silicon atom, i.e. {[SiO2]-O-}4-y-z-[T]z Si—[R1]y where z is typically from about 0 to about 2, y is typically from about 1 to about 3, and 4-y-z is from about 1 to about 3, and usually in the range of from about 1 to about 2. A corresponding number of T groups are removed from the organosilane as a result. Remaining T groups can be converted to other groups as a result of reaction (e.g. hydrolysis) under the conditions experienced in the silanisation reaction. For example, if T is an alkoxy unit or a halide, it can convert to a hydroxy group.

It is also possible for at least a portion of the organosilane to be in a dimeric form or even oligomeric form before binding to the colloidal silica, i.e. where the two or more organosilane moieties are bound to each other through Si—O—Si bonds.

The chemically bound organosilane groups can be represented by the formula [{SiO2}-O-]4-y-z-[Z]z-Si—[R1]y. The group {SiO2}-O— represents an oxygen atom on the silica surface. The organosilane silicon atom has at least one, and optionally up to three such bonds to the silica surface, where 4-y-z is from about 1 to about 3, and usually in the range of from about 1 to about 2 i.e. 4-y-z is at least about 1, and no more than about 3. Group Z is optionally present, and z is in the range of from about 0 to about 2. The organosilane silicon atom has from about 1 to about 3 [R1] groups, i.e. y is from about 1 to 3, typically from about 1 to about 2. Where there is more than 1 R1 group, they can be the same or different.

When z is not zero, the organosilane silicon comprises unreacted T groups, and/or comprises hydroxyl groups where the T group has been removed, for example through a hydrolysis reaction. Alternatively, or additionally, an Si—O—Si link can be formed with the silicon atom of a neighbouring organosilane group. Thus, in the formula {[SiO2]-O-}4-y-z[Z]z-Si—[R1]y, group Z can (on each occurrence) be selected from the groups defined under T above, and also from hydroxy groups and —O—[SiR1]' groups where the [SiR1]' group is a neighbouring organosilane group.

R1 is typically an organic moiety, comprising from about 1 to about 16 carbon atoms, for example from about 1 to about 12 carbon atoms, or from about 1 to about 8 carbon atoms. It is bound to the organosilane silicon by a direct C—Si bond.

Where there is more than one R1 group (i.e. if y is greater than 1), then each R1 can be the same or different.

R1 is preferably selected from alkyl, alkenyl, epoxy alkyl, aryl, heteroaryl, C1-6 alkylaryl and C1-6 alkylheteroaryl groups, optionally substituted with one or more groups selected from ER2, isocyanate and isocyanurate.

In ER2, E is either not present, or is a linking group selected from —O—, —S—, —OC(O)—, —C(O)—, —C(O)O—, —C(O)OC(O)—, —N(R3)-, —N(R3)C(O)—, —N(R3)C(O)N(R3)- and —C(O)N(R3)- where R3 is H or C1-6 alkyl.

R2 is linked to E, or directly to R1 if E is not present, and is selected from halogen (typically F, Cl or Br), alkyl, alkenyl, aryl, heteroaryl, C1-3 alkylaryl and C1-3 alkylheteroaryl. R2 can optionally be substituted with one or more groups selected from hydroxyl, halogen (typically F, Cl or Br), epoxy, —OR3 or —N(R3)2 where each R3 is as defined above. If E is present, R2 can also be hydrogen.

In the above definitions, alkyl and alkenyl groups can be aliphatic, cyclic or can comprise both aliphatic and cyclic portions. Aliphatic groups or portions can be linear or branched. Where any group or substituent comprises halogen, the halogen is preferably selected from F, Cl and Br.

Some groups can undergo hydrolysis reactions under conditions experienced in the colloidal silica medium. Thus, groups containing moieties such as halide, acyloxy, (meth)acryloxy and epoxy groups can hydrolyse to form corresponding carboxyl, hydroxyl or glycol moieties.

In embodiments, one or more R1 groups are C1-8 alkyl, C1-8 haloalkyl, C1-8 alkenyl or C1-8 haloalkenyl, typically C1-8 alkyl or C1-8 alkenyl, with an optional halide (e.g. chloride) substituent. Examples include methyl, ethyl, chloropropyl, isobutyl, cyclohexyl, octyl and phenyl. These C1-8 groups can, in embodiments, be C1-6 groups or, in further embodiments, C1-4 groups. Longer carbon chains tend to be less soluble in aqueous systems, which makes synthesis of the organosilane-modified colloidal silicas more complex.

In embodiments, R1 can be an alkyl isocyanate, for example propylisocyanate. R1 can also comprise an isocyanurate moiety, for example it can be or comprise a propylisocyanurate moiety.

In preferred embodiments, R1 is a hydrophilic moiety. In embodiments, R1 is a hydrophilic moiety containing at least one group selected from hydroxyl, thiol, carboxyl, ester, epoxy, acyloxy, ketone, aldehyde, (meth)acryloxy, amino, amido, ureido, isocyanate or isocyanurate. In further embodiments, hydrophilic moieties comprise at least one heteroatom selected from O and N, and comprise no more than three consecutive alkylene (—CH2-) groups linked together.

In embodiments, R1 is a group comprising from 1 to 8 carbon atoms, e.g. a C1-8 alkyl group, and which additionally comprises an ER2 substituent where E is oxygen and R2 is selected from optionally substituted C1-8-epoxyalkyl and C1-8 hydroxyalkyl. Alternatively, R2 can be optionally substituted alkylisocyanurate. Examples of such ER2 substituents include 3-glycidoxypropyl and 2,3-dihydroxypropoxypropyl.

In embodiments, R1 is a group comprising from about 1 to about 8 carbon atoms, e.g. a C1-8 alkyl group, and which additionally comprises an ER2 substituent where E is not present, and R2 is epoxyalkyl, for example an epoxycycloalkyl. An example of such an $R^1$ group is beta-(3,4-epoxycyclohexyl)ethyl. The epoxy group can alternatively be two neighbouring hydroxyl groups, e.g. $R^2$ can be a dihydroxyalkyl such as a dihydroxycycloalkyl, and $R^1$ being (3,4-dihydroxycyclohexyl)ethyl.

In embodiments, where there is more than one $R^1$ group on the Si atom of the organosilane, at least one is a C1-8 alkyl or alkenyl group.

Examples of organosilane reactants that can be used to make such functionalised colloidal silica include octyl triethoxysilane; methyl triethoxysilane; methyl trimethoxysilane; tris-[3-(trimethoxysilyl)propyl]isocyanurate; 3-mercaptopropyl trimethoxysilane; beta-(3,4-epoxycyclohexyl)-ethyl trimethoxysilane; silanes containing an epoxy group (epoxy silane), glycidoxy and/or a glycidoxypropyl group such as 3-(glycidoxypropyl) trimethoxy silane (which can also be known as trimethoxy[3-(oxiranylmethoxy)propyl]silane), 3-glycidoxypropyl methyldiethoxysilane, (3-glycidoxypropyl) triethoxy silane, (3-glycidoxypropyl) hexyltrimethoxy silane, beta-(3,4-epoxycyclohexyl)-ethyltriethoxysilane; 3-methacryloxypropyl trimethoxysilane, 3-methacryloxypropyl triisopropoxysilane, 3-methacryloxypropyl triethoxysilane, octyltrimethoxy silane, ethyltrimethoxy silane, propyltriethoxy silane, phenyltrimethoxy silane, 3-mercaptopropyltriethoxy silane, cyclohexyltrimethoxy silane, cyclohexyltriethoxy silane, dimethyldimethoxy silane, 3-chloropropyltriethoxy silane, 3-methacryloxypropyltrimethoxy silane, i-butyltriethoxy silane, trimethylethoxy silane, phenyldimethylethoxy silane, hexamethyldisiloxane, trimethylsilyl chloride, ureidomethyltriethoxy silane, ureidoethyltriethoxy silane, ureidopropyltriethoxy silane, hexamethyldisilizane, and mixtures thereof. U.S. Pat. No. 4,927,749 discloses further suitable silanes which may be used to modify the colloidal silica.

The most preferred organosilanes comprise epoxy groups, for example epoxyalkyl silanes or epoxyalkyloxyalkyl silanes. Hydroxyl-substituted groups are also preferred, for example hydroxyalkyl and hydroxyalkyloxyalkyl groups comprising one or more hydroxyl groups, e.g. about 1 or 2 hydroxyl groups. Examples include organosilanes containing a glycidoxy, glycidoxypropyl, dihydropropoxy or dihydropropoxypropyl group. These can be derived from organosilane reactants such as (3-glycidoxypropyl) trimethoxysilane, (3-glycidoxypropyl)triethoxysilane and (3-glycidoxypropyl)methyldiethoxysilane. In the compositions of the present disclosure, epoxy groups can hydrolyse to form corresponding vicinal diol groups. Therefore, the present disclosure also encompasses the diol equivalents of the above epoxy group-containing compounds.

There can be more than one different organosilane in the modified (or "functionalised") colloidal silica, for example where the organosilane-modified silica is produced by reacting a mixture of two or more organosilanes with colloidal silica, or by mixing two or more separately prepared organosilane-modified colloidal silicas.

The silane compounds can form stable covalent siloxane bonds (Si—O—Si) with the silanol groups. In addition, they can be linked to the silanol groups, e.g. by hydrogen bonds, on the surface of the colloidal silica particles. It is possible that not all silica particles become modified by organosilane. The proportion of colloidal silica particles that become functionalised with organosilane will depend on a variety of factors, for example the size of the silica particles and the available surface area, the relative amounts of organosilane reactant to colloidal silica used to functionalise the colloidal silica, the type of organosilane reactants used and the reaction conditions.

The degree of modification (DM) of silica surface by organosilane can be expressed according to the following calculation (Equation 1), in terms of the number of silane molecules per square nanometre of silica surface:

$$DM = \frac{A \times N_{organosilane}}{(S_{silica} \times M_{silica} \times 10^{18})} \quad \text{Equation 1}$$

wherein:
DM is the degree of surface modification in units of $nm^{-2}$;
A is Avogadro's constant;
$N_{organosilane}$ is the number of moles of organosilane reactant used;
$S_{silica}$ is the surface area of the silica in the colloidal silica, in $m^2\ g^{-1}$; and
$M_{silica}$ is the mass of silica in the colloidal silica, in g.

DM can be at least about 0.8 molecules of silane per $nm^2$, and is preferably in the range of from about 0.5 to about 4 molecules per $nm^2$. Preferred embodiments have DM in the range of from about 0.5 to about 3, for example from about 1 to about 2.

In the above equation, the surface area of the silica is conveniently measured by Sears titration.

The colloidal silica used in the composition of the present disclosure is a stable colloid. By "stable" is meant that the organosilane-functionalised colloidal silica particles dispersed in the (usually aqueous) medium does not substantially gel or precipitate within a period of at least about 2 months, and preferably at least about 4 months, more preferably at least about 5 months at normal storage at room temperature (about 20° C.).

Preferably, the relative increase in viscosity of the silane-functionalised colloidal silica dispersion between its preparation and up to two months after preparation is lower than about 100%, more preferably lower than about 50%, and most preferably lower than about 20%.

Preferably, the relative increase in viscosity of the silane-functionalised colloidal silica between its preparation and up to four months after preparation is lower than about 200%, more preferably lower than about 100%, and most preferably lower than about 40%.

The silica particles within the silica sols can be modified with one or more additional oxides, for example, with aluminium oxide or boron oxide. Boron-modified silica sols are further described in e. g. U.S. Pat. No. 2,630,410. Alumina-modified silica particles suitably have an Al2O3 content of from about 0.05 to about 3 wt %, for example from about 0.1 to about 2 wt %. The procedure of preparing an alumina-modified silica sol is further described e.g. in "The Chemistry of Silica", by Iler, K. Ralph, pages 407-409, John Wiley & Sons (1979) and in U.S. Pat. No. 5,368,833.

Typically, the silica in the colloidal silica does not contain any added additional oxides, and comprises no more than trace or impurity amounts in each case, for example less than about 1000 ppm by weight each of additional oxides. Typically, the total amount of non-silica oxides present in the sol is less than about 5000 ppm by weight, preferably less than about 1000 ppm.

The colloidal silica particles suitably have an average particle diameter ranging from about 2 to about 150 nm, preferably from about 3 to about 50 nm, and most preferably from about 5 to about 25 nm. In preferred embodiments, the average particle diameter is in the range of from about 6 to about 20 nm. Suitably, the colloidal silica particles have a specific surface area from about 20 to about 1500 m2 g-1, preferably from about 50 to about 900 m2 g-1, and more preferably from about 70 to about 600 m2 g-1, for example from about 70 to about 500 m2 g-1 or from about 150 to 500 m2 g-1.

The surface areas are often expressed as the surface areas of the "bare" or "unfunctionalised" colloidal silicas that are used for the synthesis. This is because functionalisation of a silica surface can complicate the surface area measurements. Surface areas can be measured using Sears titration (G. W. Sears; Anal. Chem., 1956, 28(12) pp 1981-1983). The particle diameter can be calculated from the titrated surface area using a method described in "The Chemistry of Silica", by Iler, K. Ralph, page 465, John Wiley & Sons (1979). Based on the assumption that the silica particles have a density of 2.2 g cm$^{-3}$, and that all particles are of the same size, have a smooth surface area and are spherical, then the particle diameter can be calculated from Equation 2:

$$\text{Particle diameter (nm)} = \frac{2720}{\text{Surface Area(m}^2\text{g}^{-1}\text{)}} \quad \text{Equation 2}$$

The colloidal silica particles are typically dispersed in water in the presence of stabilising cations, which are typically selected from $K^+$, $Na^+$, $Li^+$, $NH_4^+$, organic cations, quaternary amines, tertiary amines, secondary amines, and primary amines, or mixtures thereof so as to form an aqueous silica sol. Dispersions can also comprise organic solvents, typically those that are water miscible e. g. lower alcohols, acetone or mixtures thereof, preferably in a volume ratio to water of about 20% or less. Preferably, no solvents are added to the colloidal silica or functionalised colloidal silica. Organic solvents in the composition can arise during synthesis of the organosilane-functionalised colloidal silica, due to reaction of organosilane reactant with the silica. For example, if the organosilane reactant is an alkoxide, then the corresponding alcohol will be produced. The amount of any organic solvent is preferably kept below about 20% by weight, preferably less than about 10% by weight.

The silica content of the functionalised silica sol is preferably in the range of from about 5 to about 60% by weight, more preferably from about 10 to about 50%, and most preferably from about 15 to about 45%. This is expressed as weight % of unfunctionalised silica, and is calculated from the weight % of silica in the colloidal silica source before modification with organosilane.

The pH of the functionalised silica sol is suitably in the range of from about 1 to about 13, preferably from about 2 to about 12, such as from about 4 to about 12, or from about 6 to about 12, and most preferably from about 7.5 to about 11. Where the silica is aluminium-modified, the pH is suitably in the range of from about 3.5 to about 11.

The functionalised colloidal silica suitably has an S-value from about 20 to about 100, preferably from about 30 to about 90, and most preferably from about 60 to about 90.

The S-value describes the extent of aggregation of colloidal silica particles, i.e. the degree of aggregate or microgel formation. The S-value can be measured and calculated according to the formulae given in Iler, R. K. & Dalton, R. L. in J. Phys. Chem., 60 (1956), 955-957.

The S-value is dependent on the silica content, the viscosity, and the density of the colloidal silica. A high S-value indicates a low microgel content. The S-value represents the amount of SiO2 in percent by weight present in the dispersed phase of a silica sol. The degree of microgel can be controlled during the production process as further described in e.g. U.S. Pat. No. 5,368,833.

As with surface area, the S value of organosilane-functionalised colloidal silica is typically expressed as the S-value of the colloidal silica before silane modification.

In embodiments, the weight ratio of organosilane to silica in the silane-functionalised silica sol is from about 0.003 to about 1.5, preferably from about 0.006 to about 0.5, and most preferably from about 0.015 to about 0.25.

In this context, the weight of organosilane in the dispersion is calculated as the total amount of possible free organosilane compounds and organosilane derivatives or groups bound or linked to the silica particles, i.e. based on the total amount of organosilane reactant(s) initially added to the colloidal silica to produce the organosilane modified silica, and not necessarily based on a direct measure of how much organosilane is actually chemically bound to the silica.

The organosilane-functionalsed colloidal silica helps to improve various properties of the coating composition, compared for example to compositions which comprise no colloidal silica.

Of particular note is improved tear resistance, tensile strength, reflectance of electromagnetic radiation reflectance over the wavelength range of about 280 to about 2500 nm, dirt pick-up resistance to both hydrophobic and hydrophilic materials, wet and dry adherence, and storage stability.

In addition, these advantages can be achieved while the coating composition still complies with other requirements, such as elongation at break, elasticity, and in water uptake, water permeability and water swelling properties.

The content of the organosilane-modified colloidal silica in the composition is typically in the range of from about 1 to about 20 wt % (i.e. weight of the aqueous colloid), for example from about 2 to about 15 wt %, or in the range of from about 2 to about 11 wt %.

On a silica (or "solids") basis, the silica content in the coating composition is typically from about 0.1 to 10 wt %, for example from about 0.5 to about 7 wt %, or from about 0.5 to about 3 wt %.

[Microspheres]

The solar reflective coating composition comprises polymeric microspheres.

Preferably, the microspheres are hollow, as this helps to improve the reflectance properties of the coating composition, in particular the visible (VIS) and near (NIR) reflectance.

Suitable hollow polymeric microspheres include expandable and expanded microspheres. Expandable polymeric microspheres comprise a polymeric shell, typically a thermoplastic polymer shell, enclosing one or more volatile fluids. When heated, the volatile fluid expands, causing corresponding expansion of the microspheres to produce the expanded microspheres. Expanded polymeric microspheres are preferred.

The volatile fluid is selected such that it has a sufficiently high vapour pressure at temperatures above the softening temperature of the polymeric shell to be able to expand the microspheres, and hence is preferably not higher than the softening point of the polymeric shell. Typically the boiling point of the volatile fluid at atmospheric pressure is in the range of from about −50 to about 250° C., for example in the range from about −20 to about 200° C. or from about −20 to about 150° C., and preferably in the range of from about −20 to about 100° C. The volatile fluid in embodiments makes up about 5 to about 40 wt % of the total weight of the polymeric microsphere, for example from about 10 to about 30 wt % or from about 15 to about 25 wt %.

Examples of the volatile fluid include C4-10 cyclic, linear or branched hydrocarbons, typically C4-12 alkanes or alkenes; including petroleum ether. Examples include n-pentane, isopentane, neopentane, cyclopentane, cyclohexane, butane, isobutane, isohexane, neohexane, heptane, isoheptane, isoheptane, octane, isooctane, isodecane, isododecane. Other volatile fluids include C1-12 haloalkanes or haloalkenes, such as perfluorinated hydrocarbons, and C1-2 haloalkanes and haloalkenes such as chloromethane, dichloromethane, dichloroethylene, trichloroethane, trichloroethylene, trichlorofluoromethane, and other perfluorinated hydrocarbons. The volatile fluid is preferably selected from one or more of n-butane, isobutane, n-pentane, isopentane, isohexane, isooctane and isododecane.

The polymeric component of the polymeric microspheres can be a homo- or co-polymer, resulting from polymerisation of ethylenically unsaturated monomers. The monomers can, in embodiments, include nitrile-containing monomers such as acrylonitrile, methacrylonitrile, α-chloroacrylonitrile, α-ethoxyacrylonitrile, fumaronitrile or crotonitrile. The monomers can, in embodiments, include acrylic esters such as methyl acrylate or ethyl acrylate, methacrylic esters such as methyl methacrylate, isobornyl methacrylate, ethyl methacrylate or hydroxyethyl methacrylate. The monomers can, in embodiments, include vinyl halides such as vinyl chloride; vinylidene halides such as vinylidene chloride; vinyl pyridine or vinyl esters such as vinyl acetate. The monomers can, in embodiments, include styrenes such as styrene, halogenated styrenes or α-methyl styrene; dienes such as butadiene, isoprene and chloroprene; unsaturated carboxylic compounds such as acrylic acid, methacrylic acid and salts thereof; or other unsaturated monomers such as acrylamide or N-substituted maleimides. Any mixtures of any such monomers can also be used.

The polymer shell is preferably a thermoplastic polymer shell, which in embodiments comprises a nitrile-containing monomer, preferably making up from about 40 to about 100 wt %, for example about 60 to about 100 wt %, about 80 to about 100 wt %, or about 90 to about 100 wt % of the monomers that polymerise to form the polymer shell.

In preferred embodiments, the nitrile-containing monomers are selected from acrylonitrile and methacrylonitrile. If other ethylenically unsaturated monomers are present, they are preferably selected from one or more of vinylidene halides, acrylic esters and methacrylic esters.

The softening temperature of the polymer shell, normally corresponding to its glass transition temperature (Tg), is preferably within the range of from about 60 to about 200° C., preferably from about 80 to about 200° C.

The boiling point of the volatile fluid, where present, is usually no higher than the softening temperature of the polymeric shell.

For expandable polymeric microspheres, the Tstart temperature (i.e. the temperature at which expansion begins) is preferably in the range of from about 60 to about 200° C., for example from about 80 to about 190° C., or from about 100 to about 180° C. Tmax (i.e. the temperature at which maximum expansion is reached) is preferably higher than about 130° C., and more preferably higher than about 150° C. Tmax usually does not exceed about 300° C.

The microspheres can comprise crosslinking multifunctional monomers, for example one or more of divinyl benzene, ethylene glycol di(meth)acrylate, di(ethylene glycol) di(meth)acrylate, triethylene glycol di(meth)acrylate, propylene glycol di(meth)acrylate, 1,4-butanediol di(meth)acrylate, 1,6-hexanediol di(meth)acrylate, glycerol di(meth)acrylate, 1,3-butanediol di(meth)acrylate, neopentyl glycol di(meth)acrylate, 1,10-decanediol di(meth)acrylate, pentaerythritol tri(meth)acrylate, trimethylol propane tri(meth)acrylate, tributanediol di(meth)acrylate, PEG #200 di(meth)acrylate, PEG #400 di(meth)acrylate, PEG #600 di(meth)acrylate, 3-acryloyloxyglycol monoacrylate, triacryl formal, triallyl isocyanate and triallyl isocyanurate.

The polymer shell, in embodiments, constitutes about 60 to about 95 wt % of the polymeric microsphere, for example about 70 to about 85 wt %. Crosslinking multifunctional monomers preferably constitute up to about 10 wt %, for example from about 0.01 to about 10 wt %, or from about 0.1 to about 1 wt %, and preferably from about 0.2 to about 0.5 wt % of the total amount of monomer used to make the polymeric shell.

The polymeric microspheres may comprise additional components, for example one or more solid suspending agents that are used in their manufacture, for example chosen from silica, chalk, bentonite, starch, crosslinked polymers, methyl cellulose, gum agar, hydroxypropyl methyl cellulose, carboxymethyl cellulose, colloidal clays and one or more salts, oxides and hydroxides of metals such as Al, Ca, Mg, Ba, Fe, Zn, Ni and Mn. Examples of salts, oxides and hydroxides of metals include one or more of calcium phosphate, calcium carbonate, magnesium hydroxide, barium sulfate, calcium oxalate, and hydroxides of aluminium, iron, zinc, nickel and manganese. If present, these solid suspending agents are normally mainly located on the outer surface of the polymer shell. Solid suspending agents are typically present in an amount of from about 0 to about 20 wt % of the total weight of the polymeric microspheres, for example in the range of from about 1 to about 20 wt %, or from about 2 to about 10 wt %.

The polymeric microspheres used in the composition of the present disclosure typically have volume mean particle sizes (diameters), i.e. have D(0.5) values, in the range of from about 1 to about 500 μm, preferably in the range of from about 3 to about 200 μm, more preferably in the range of from about 5 to about 100 μm, for example in the range of from about 10 to about 60 μm. The particle sizes are suitably measured using light scattering techniques, e.g. laser diffraction, such as low angle laser light scattering (LALLS). The microspheres can be expanded from unexpanded microspheres. Typically, heating unexpanded microspheres by heating to a temperature above the Tstart temperature results in an expansion in size from about 2 to about 7 times their original diameter, for example from about 4 to about 7 times their original diameter.

The microspheres can be used in a non-expanded or expanded form, and mixtures of expanded and non-expanded microspheres can be used. Examples of suitable microspheres include those described in WO2007/073318, and also those sold under the tradename Expancel™.

The microspheres can be provided in dry form, in wet form, or in slurry form. Wet form (usually wet with water) is typically preferred, to ensure good dispersion in the coating composition. Slurry form is also advantageous, although costs more to transport.

Adding microspheres to a coating composition can improve the storage stability, the coating lifetime and ageing characteristics, the reflectance over the wavelength range of about 280 to about 2500 nm, and the wet adherence.

Adding both microspheres and organosilane-functionalised colloidal silica can improve storage stability, tensile strength, reflectance over the wavelength range of about 280 to about 2500 nm, wet adherence, and dirt pick-up resistance to both hydrophobic and hydrophilic contaminants. This is also while ensuring the coating composition still complies with other requirements, for example tear resistance, elasticity, elongation at break, and dry adherence properties.

The compositions comprising both microspheres and organosilane-functionalised colloidal silica are particularly superior in terms of their long-term performance, the aged coatings in particular showing significantly improved tensile strength, reflectance and wet adherence and dirt pick-up resistance compared to the comparative materials.

The amount of microspheres in the coating composition by weight is typically low, especially where low density, hollow microspheres are used. Typically, the content of microspheres in the coating composition (based on dry microspheres) is in the range of from about 0.05 to about 5 wt %, for example in the range of from about 0.1 to about 3 wt %, for example in the range of from about 0.2 to about 1.5 wt %.

Organic Binder

The solar reflective coating composition typically includes an organic binder, for example selected from one or more chosen from latex, water soluble resins and water soluble polymers. Alkyd resins can be used, for example in organic solvent-based coatings. However, water-based coating compositions are preferred.

Examples of water soluble resins and polymers include poly(vinyl alcohols), modified poly(vinyl alcohols), polycarboxylates, poly(ethylene glycols), poly(propylene glycols), polyvinylpyrrolidones, polyallylamines, poly(acrylic acids), polyamidamines, polyacrylamides and polypyrroles. Other binders include proteins such as casein, soybean proteins, synthetic proteins. Further examples of binders include polysaccharides, for example cellulose and cellulose derivatives such as methylcelluloses, ethylcelluloses and hydroxyethylcelluloses, starches and modified starches, chitosan, and polysaccharide gums such as guar gums, arabic gums and xanthan gums.

The term "latex" includes synthetic and natural latices based on emulsions of resins and/or polymers, for example styrene-butadiene polymers, butadiene polymers, polyisoprene polymers, butyl polymers, nitrile polymers, vinylacetate homopolymers, acrylic polymers such as vinylacrylic polymers or styrene-acrylic polymers, polyurethanes, epoxy polymers, cellulosic polymers such as micro cellulose, melamine resins, neoprene polymers, phenol based polymers, polyamide polymers, polyester polymers, polyether polymers, polyolefin polymers, polyvinyl butyral polymers, silicones such as silicone rubbers and silicone polymers (e.g. silicone oils), urea-formaldehyde polymers and vinyl polymers.

In embodiments, where the coating is for external use (for example as a solar reflective coating for buildings) the organic binder is not, or does not include, a water-soluble resin or polymer.

In embodiments, the binder is or comprises a latex. In other embodiments, the binder is or comprises an acrylic polymer, e.g. a styrene-acrylic polymer. In further embodiments, the binder is or comprises, a polyurethane. In yet further embodiments, the binder comprises both an acrylic polymer and a polyurethane.

The coating composition is preferably an elastomeric coating, for example comprising an acrylic polymer and/or polyurethane binder.

Acrylic polymers, often also referred to as acrylics, acrylates, polyacrylates or acrylate polymers, that are suitable for use in the present disclosure are typically obtained from mono-ethylenically unsaturated monomers, for example by emulsion polymerization. They may be prepared from suitable acrylate monomers which are based on the structure of acrylic acid, i.e. which comprises a vinyl group and a carboxylic acid terminus. Other typical acrylate monomers are derivatives of acrylic acid, such as methyl methacrylate in which one vinyl hydrogen and the carboxylic acid hydrogen are both replaced by methyl groups. Other examples of acrylate monomers are: methacrylates, methyl acrylate, ethyl acrylate, 2-chloroethyl vinyl ether, 2-ethylhexyl acrylate, hydroxyethyl methacrylate, butyl acrylate, butyl methacrylate, acrylonitrile, methacrylonitrile, methyl methacrylate, ethyl methacrylate, hydroxyethyl acrylate, hydroxylethyl methacrylate, hydroxypropyl acrylate, hydroxylpropyl methacrylate, lauryl acrylate, lauryl methacrylate, trimethylol propane triacrylate, trimethylol propane trimethacrylate, hexanediol diacrylate, polyethylene oxide acrylate, polypropylene oxide acrylate, polypropylene oxide methacrylate allyl alcohol, acrylamide, methacrylamide, vinyl chloride, vinylidene chloride, and TMPTA. Also mixtures of two or more of these monomers can be used. Acrylates are called homopolymers if they include one type of acrylate monomer. Alternatively, they may be called hetero-polymer when comprising two or more types of monomer. Acrylate polymers may be obtained via a free radical addition mechanism.

Preferably at least one of the monomers comprises a polar functional group such as an acrylamide, alkyleneoxide or hydroxy functional group, more preferably a hydroxy functional group. Examples of suitable monomers comprising a hydroxy functional group are hydroxyethyl acrylate, hydroxyethyl methacrylate, hydroxypropyl acrylate, and hydroxypropyl methacrylate. More preferably, the one or more monomers are a mixture of monomers comprising a hydroxy functional group and monomers free of such hydroxy functional group, such as for example a mixture comprising hydroxyethyl acrylate and methyl methacrylate.

The organic binder can comprise mixtures of two or more polymers and/or latices. In other embodiments, copolymers (e.g. block or random copolymers) can be used, based on copolymerization of monomer or oligomer mixtures, or alternatively the copolymer can be in the form of a graft copolymer, in which the reactive groups of a polymer backbone can be used to graft different monomeric, oligomeric or polymeric units.

The amount of binder in the coating composition is typically in the range of from about 10 to about 70 wt % of the composition. This is based on the total weight, for example the total organic+water weight in the case of latices/emulsions. In embodiments, the amount is in the range of from about 20 to about 60 wt %, for example in the range of from about 30 to about 55 wt %.

The glass transition (Tg) temperature of the resins of the binder can be selected depending on the application, but are usually less than about 70° C., and in preferred embodiments are less than about 50° C., and even more preferably less than about 20° C.

In some applications where good elastomeric properties are required, for example cool roof or solar reflective coatings that are applied to external surfaces, they may need to accommodate a high degree of expansion and contraction, resulting from day/night temperature changes, and also rapid temperature changes that can be brought on by sudden changes in weather, for example hail storms or hurricanes. Therefore, in embodiments, the Tg of the resin/polymer in the organic binder is below about 0° C., for example below about −10° C., more preferably below about −20° C., and in some embodiments below about −35° C. Usually, the Tg is not below about −100° C., and in embodiments it is not below about −70° C., or about −50° C.

If the organic binder comprises more than one type of resin or polymer, then these Tg values an apply to one or more than one of the resins/polymers.

The Tg can be measured by differential scanning calorimetry (DSC), for example using method DIN 53765, or the method described in WO2016/012358.

Solvents

The solar reflective coating composition can comprise one or more solvents, including co-solvents. Preferably, the solvent is water. In embodiments, some organic solvent can also be present, although preferably no more than about 30 wt %, and more preferably no more than about 25 wt % or no more than about 20 wt % organic solvent, based on the total amount of water and organic solvent.

Examples of organic solvents that can be used include ethylene glycols, propylene glycols, ethylene glycol ethers such as phenyl- and $C_{1-4}$ alkyl-ethylene glycol ethers, and propylene glycol ethers such as phenyl- and $C_{1-4}$ alkyl-propylene glycol ethers. In embodiments, mixtures of glycol ethers and alcohols can be used. In further embodiments, one or more dibasic esters or ester alcohols can be used. Polar solvents and water-miscible solvents are preferred.

Specific examples of suitable commercially available organic solvents include Lusolvan™ FBH (di-isobutyl ester of a mixture of dicarboxylic acids), Lusolvan™ PP (di-isobutyl ester of a mixture of dicarboxylic acids), Loxanol™ EFC 300 (C12 and C14 fatty acid methyl esters), Butyl Carbitol™ (diethylene glycol monobutyl ether), Butyl Cellosolve (ethylene glycol monobutyl ether), Dowanol™ EPh (ethylene glycol phenyl ether), Dowanol™ PPh (propylene glycol phenyl ether), Dowanol™ TPnB (tripropylene glycol n-butyl ether), Dowanol™ DPnB (di(propylene glycol) butyl ether, mixture of isomers), DBE-9™ (a mixture of refined dimethyl gluterate and dimethyl succinate), Eastman DB™ solvent (diethylene glycol monobutyl ether), Eastman EB™ (ethylene glycol monobutyl ether), Texanol™ (2,2,4-trimethyl-1,3-pentanediol monoisobutyrate), Dapro™ FX 511 (2-ethyl hexanoic acid), Velate™ 262 (isodecyl benzoate), and Arcosolve™ DPNB (dipropylene glycol normal butyl ether).

Aqueous coating compositions are preferred, since they avoid high volatile organic compounds (VOC) content that are often associated with organic solvent-borne paints.

In one embodiment the liquid coating composition comprises the organic solvent in an amount in the range of from about 0.1 to about 5.0 wt %, more preferably of from about 0.2 to about 3.0 wt %, based on the total weight of the coating composition.

Pigments

The solar reflective coating composition may comprise any suitable dyes or color pigments, including inorganic extenders or fillers. The amount of high density inorganic solids such as inorganic white or color pigments and inorganic extenders or fillers such as calcium carbonate, chalk or clays is preferably such that the solids content of the coating remains within the preferred ranges of solids content about >30 wt %. Typically, the solids content of the coating composition is in the range of from about 40 to about 75 wt %, for example in the range of from about 50 to about 70 wt %.

Pigments can ordinarily include opacifying pigments, such as titanium dioxide, zinc oxide or leaded zinc oxide. However, coloured or tinting pigments are not outside the scope of present disclosure, for example carbon black, yellow oxides, brown oxides, tan oxides, raw and burnt sienna or umber, chromium oxide green, phthalocyanine green, phthalonitrile blue, ultramarine blue, cadmium pigments or chromium pigments. Fillers can also be added, such as clay, silica, talc, or mica.

For improving solar reflectance and cool roof effects, titanium dioxide pigments are preferred in view of their high refractive index.

The use of the hollow microspheres and organosilane-functionalised colloidal silica in the coating composition also helps achieve high "whiteness" characteristics, in view of their beneficial effects on dirt pick-up resistance. This can be particularly important where local standards require enhanced whiteness/reflectance characteristics.

[Substrates]

Suitable substrates which may be coated with the solar reflective coating composition of the present disclosure include wood, wooden based substrates (e.g. MDF, chipboard), metal, stone, plastics and plastic films, natural and synthetic fibers, glass, ceramics, plaster, asphalt, concrete, leather, paper, foam, masonry, brick and/or board.

The coating composition can be applied to such substrates by any conventional method, including brushing, dipping, flow coating, spraying, roller coating or pad coating. For spraying, further dilution of the composition with a suitable solvent (for example further water or acetone) may be required.

Other Additives

The coating composition can contain one or more other additives such as driers, secondary driers, drying accelerating complexing agents, levelling agents, UV stabilizers, dispersants, surfactants, inhibitors, anti-static agents, anti-oxidants, biocides, anti-skinning agents, flame-retardant agents, lubricants, anti-foaming agents, extenders, plasticizers, anti-freezing agents, waxes, thickeners, or thixotropic agents.

Other ingredients that may be present in the coating composition depend on the envisaged application of the composition. Examples are anti-settling agents, anti-sagging agents and de-airing agents.

The total weight of these other additives typically does not exceed about 10 wt % of the total coating composition, and in embodiments their amount does not exceed about 5 wt %.

Examples of some of these other additives are provided below.

Anti-Oxidants and Anti-Skinning Agents

The solar-reflective coating composition may optionally comprise various anti-oxidants and anti-skinning agents such as methylethylketoxime, acetonoxime, butyraldoxime, dialkylhydroxylamine, cyclohexanoneoxime 2-pentanone oxime or mixtures thereof. Where present, the concentration of anti-oxidant or anti-skinning compound applied is preferably in a range of from about 0.001 to about 2 wt %, by weight of the composition.

Thickeners

The coating composition comprising the binder composition of the present disclosure, may additionally comprise one or more thickeners.

Known thickeners include rheology modifying clays, and non-associative and associative organic thickeners.

Examples of clay thickeners include bentonite, attapulgite, and other montmorillonite clays.

Non-associative thickeners are water-soluble (or at least water-swellable) polymers which increase viscosity mainly by overlap and/or entanglement of their polymer chains and/or by their occupation of large volumes of space within the coating composition. These effects are promoted by the molecular weight, stiffness and straightness of their polymer chains.

Examples of non-associative organic thickeners are the long, medium or short chain cellulose ethers known as "cellulosics" which comprise straight and stiff polymeric backbones making cellulosics exceptionally effective in increasing the viscosity of aqueous systems. Examples of cellulosics include hydroxyethyl cellulose, methyl cellulose, hydroxypropylmethyl cellulose and ethyl hydroxyethyl cellulose.

Associative thickeners are also water-soluble (or at least water-swellable) polymers. They have chemically-attached hydrophobic groups that are capable of self-association into micellar-like assemblies as well as non-specific adsorption onto all colloidal surfaces present. This behaviour is similar to that of conventional surfactants. It results in a transient network of polymer chains which increase the Brookfield viscosity of coating compositions.

Associative thickeners have found extensive commercial use in aqueous coating compositions. Different types can be distinguished.

A first type is the hydrophobically modified alkali soluble emulsion or "HASE" type. Commercial examples of HASE type thickeners have hydrophilic backbones comprising salts of polymerised or copolymerised unsaturated carboxylic acids or acid anhydrides such as acrylic or methacrylic acids or maleic anhydride. Hydrophilic moieties such as polyalkylene glycols (e.g. polyethylene glycol) are attached to the hydrophilic backbones and hydrophobic groups are in turn are attached to the hydrophilic moieties. In use, solutions of these HASE type thickeners are added as free-flowing liquids to a coating composition at neutral or slightly acidic pH. An increase in Brookfield viscosity is then caused by raising the pH to mildly alkaline conditions whereupon carboxylate anions are formed.

A second type of associative thickener is the hydrophobically modified hydroxy alkyl (especially ethyl) cellulosic or "HMHEC" type conveniently made by the addition of long chain alkyl epoxides to hydroxyalkyl celluloses of the type used as non-associative thickeners.

A third type of associative thickener is the block/condensation copolymer "HEUR" type (hydrophobically modified ethoxylate urethane thickeners) comprising hydrophilic blocks and hydrophobic blocks usually terminating in hydrophobic groups. The hydrophilic blocks may be provided by polyalkylene oxide (especially polyethylene oxide) moieties of relatively low molecular weight of say below about 10,000 Da, preferably about 3,400 to 8,000 Da. The hydrophilic blocks are condensed with for example hydrophobic urethane-forming di-isocyanates such as toluene di-isocyanate.

A fourth type of associative thickener is the hydrophobically modified polyacrylamide type in which the hydrophobic groups are incorporated as free radical copolymers with N-alkyl acrylamides. These are most useful in acidic coating compositions.

A fifth type of associative thickener does exist that is a hydrophobically modified ethoxylate urethane alkali-swellable emulsion or "HEURASE" type. This type combines the functionality of the HASE and HEUR types.

Other thickeners that can be used include hydrophobically-modified polyacetal polyether (HM-PAPE) thickeners, described for example in WO2003/037989, U.S. Pat. Nos. 5,574,127 and 6,162,877.

EXAMPLES

The present disclosure will now be illustrated by the following non-limiting examples. They are generally aqueous compositions based on an acrylic binder, and contain either a glycidoxypropyl silane-modified aqueous colloidal silica (Levasil™ CC301) or expandable polymeric microspheres (Expancel™ 461WE20d36), or both.

The CC301 glycidoxypropyl-functionalised colloidal silica is an aqueous sol, having a silica content of 28 wt %, a pH of 8, a density of 1.2 g cm$^{-3}$, a viscosity of 5 cP, and an ethanol content of 2.5 wt %. The colloidal silica from which the functionalised colloidal silica is prepared typically has an S value in the range of from about 60 to 90, and a surface area of 360 m$^2$ g$^{-1}$, giving an average particle size of 7 nm. The DM value is typically 1.4.

The Expancel™ 461WE20d36 expanded polymeric microspheres are provided in a water-wet form, with a typical "dry" solids (microsphere) content of 15 wt %. The water typically comprises less than 1 wt % dispersing agents. The particles have a volume mean particle size, D(0.5), in the range of about 20-30 μm (as measured by Malvern Mastersizer 2000), and the spheres have a density of 36 kg m$^{-3}$. The polymer shell is an acrylonitrile copolymer, also containing vinylidene chloride and methyl methacrylate monomers.

The resin binder used in the examples (PRIMAL™ or Rhoplex™ EC-1791 E) is an acrylic emulsion, free of APEO (alkylphenol ethoxylate), with a solid content of 55 wt %. The resin has a $T_g$ of −40° C.

The examples were formulated to use the same mass of pigment (TiO$_2$ and ZnO), and to maintain a constant PVC (pigment volume concentration). Where colloidal silica and polymeric microspheres were added, a corresponding reduction in the calcium carbonate filler and additional water was made. In Examples 8 to 10, the amount of organosilane-functionalised colloidal silica used was the same as corresponding examples 4 to 6.

Example 1—Comparative

| Component | Commercial name | Weight (g) |
|---|---|---|
| Mill-Base | | |
| Water | | 152.50 |
| Dispersant | Orotan ™ 851 | 1.60 |
| Dispersant | KTPP $^{(1)}$ | 1.40 |
| De-foamer | DAPRO ™ 7580 | 1.90 |
| Calcium carbonate | Snowhite ™ 12 | 422.20 |
| TiO$_2$ | Kronos ™ 2160 | 90.00 |
| Zinc oxide | Kadox ™ 915 | 20.00 |
| Let-Down | | |
| Binder-Latex (acrylic emulsion) | Primal ™ EC-1791 | 470.60 |
| De-foamer | DAPRO ™ DF 7005 | 1.90 |
| Solvent (propanediol monoester) | DAPRO ™ FX 511 | 7.00 |
| Mildewcide (Fungicide) | Acticide ™ MBS | 2.10 |
| Mildewcide (Fungicide) | Acticide ™ MKW2 | 1.20 |
| Solvent (propylene glycol) | | 24.40 |
| Diisononyl phthalate (DINP) | Jayflex ™ DINP | 3.00 |

| Component | Commercial name | Weight (g) |
| --- | --- | --- |
| 1,2-Cyclohexane dicarboxylic acid diisononyl ester | Hexamoll ™ DINCH | 35.00 |
| Hydrophobically modified ethylhydroxycellulose. | Bermocoll ™ EHM Extra | 4.20 |
| Total | | 1239 |
| Total Solid content (wt %) | 63.84% | |
| Pigment Volume Concentration | 43.1% | |

[1] Potassium tetrapyrophosphate

Example 2

This Example is based on the formulation of Example 1, except that it comprises ca 2 wt % of expanded Expancel™ polymeric microspheres, where half of the calcium carbonate has been replaced with a corresponding volume of polymeric microspheres. The total mass is less than that of Example 1, because of the extremely low density of the polymeric microspheres.

| Component | Commercial name | Weight (g) |
| --- | --- | --- |
| Mill Base | | |
| Water | | 136.61 |
| Dispersant | Tamol ™ 851 | 1.60 |
| Dispersant | KTPP [1] | 1.40 |
| De-foamer | DAPRO ™ 7580 | 1.90 |
| Calcium carbonate | Snowhite ™ 10 | 211.10 |
| TiO$_2$ | Kronos ™ 2160 | 90.00 |
| Zinc oxide | Kadox ™ 915 | 20.00 |
| Let-Down | | |
| Binder-Latex (acrylic emulsion) | Rhoplex ™ EC-1791 | 470.6 |
| De-foamer | DAPRO ™ DF 7005 | 1.90 |
| Solvent (propanediol monoester) | DAPRO ™ FX 511 | 7.00 |
| Mildewcide (Fungicide) | Acticide ™ MBS | 2.10 |
| Mildewcide (Fungicide) | Acticide ™ MKW2 | 1.20 |
| Solvent (propylene glycol) | | 24.40 |
| Diisononyl phthalate (DINP) | Jayflex ™ DINP | 3.00 |
| 1,2-Cyclohexane dicarboxylic acid diisononyl ester | Hexamoll ™ DINCH | 35.00 |
| Polymeric microspheres [2] | Expancel ™ 461WE20d36 | 18.70 |
| Methyl ethyl hydroxyethyl cellulose | Bermocoll ™ EBM 8000 | 4.20 |
| Total | | 1031 |
| Total Solid content (wt %) | 56.54% | |
| Pigment Volume Concentration | 43.1% | |

[1] Potassium tetrapyrophosphate
[2] Total, wet weight

Example 3

This Example is based on the formulation of Example 1, except that it comprises ca 5 wt % of expanded Expancel™ polymeric microspheres, and uses no calcium carbonate, the volume of microspheres being equivalent to the volume of the calcium carbonate used in Example 1. Because of the extremely low density of the polymeric microspheres, the mass of the formulation is significantly lower than that of Example 1.

| Component | Commercial name | Weight (g) |
| --- | --- | --- |
| Mill Base | | |
| Water | | 120.72 |
| Dispersant | Tamol ™ 851 | 1.60 |
| Dispersant | KTPP [1] | 1.40 |
| De-foamer | DAPRO ™ 7580 | 1.90 |
| Calcium carbonate | Snowhite ™ 10 | 0 |
| TiO$_2$ | Kronos ™ 2160 | 90.00 |
| Zinc oxide | Kadox ™ 915 | 20.00 |
| Let-Down | | |
| Binder-Latex (acrylic emulsion) | Rhoplex ™ EC-1791 | 470.60 |
| De-foamer | DAPRO ™ DF 7005 | 1.90 |
| Solvent (propanediol monoester) | DAPRO ™ FX 511 | 7.00 |
| Mildewcide (Fungicide) | Acticide ™ MBS | 2.10 |
| Mildewcide (Fungicide) | Acticide ™ MKW2 | 1.20 |
| Solvent (propylene glycol) | | 24.40 |
| Diisononyl phthalate (DINP) | Jayflex ™ DINP | 3.00 |
| 1,2-Cyclohexane dicarboxylic acid diisononyl ester | Hexamoll ™ DINCH | 35.00 |
| Polymeric microspheres [2] | Expancel ™ 461WE20d36 | 37.40 |
| Methyl ethyl hydroxyethyl cellulose | Bermacoll ™ EBM 8000 | 4.20 |
| Total | | 822 |
| Total Solid content(wt-%) | 45.53% | |
| Pigment Volume Concentration | 43.1% | |

[1] Potassium tetrapyrophosphate
[2] Total, wet weight

Example 4

This Example is based on the formulation of Example 1, except that it comprises ca 6 wt % of organosilane-functionalised colloidal silica, based on the total weight of the formulation, and comprises correspondingly less added water in the mill base.

| Component | Commercial name | Weight (g) |
| --- | --- | --- |
| Mill Base | | |
| Water | | 98.20 |
| Dispersant | Tamol ™ 851 | 1.60 |
| Dispersant | KTPP [1] | 1.40 |
| De-foamer | DAPRO ™ 7580 | 1.90 |
| Calcium carbonate | Snowhite ™ 10 | 401.11 |
| TiO$_2$ | Kronos ™ 2160 | 90.00 |
| Zinc oxide | Kadox ™ 915 | 20.00 |
| Let-Down | | |
| Binder-Latex (acrylic emulsion) | Rhoplex ™ EC-1791 | 475.00 |
| De-foamer | DAPRO ™ DF 7005 | 1.90 |
| Solvent (propanediol monoester) | DAPRO ™ FX 511 | 7.00 |
| Mildewcide (Fungicide) | Acticide ™ MBS | 2.10 |
| Mildewcide (Fungicide) | Acticide ™ MKW2 | 1.20 |
| Solvent (propylene glycol) | | 24.40 |
| Diisononyl phthalate (DINP) | Jayflex ™ DINP | 3.00 |

| Component | Commercial name | Weight (g) |
|---|---|---|
| 1,2-Cyclohexane dicarboxylic acid diisononyl ester | Hexamoll ™ DINCH | 35.00 |
| Functionalised Colloidal Silica [2] | Levasil ™ CC301 | 74.62 |
| Polymeric microspheres [3] | Expancel ™ 461WE20d36 | 0 |
| Methyl ethyl hydroxyethyl cellulose | Bermacoll ™ EBM 8000 | 4.20 |
| Total | | 1243 |
| Total Solid content(wt %) | 63.84% | |
| PVC | 43.1% | |

[1] Potassium tetrapyrophosphate
[2] Total colloidal silica weight (i.e. including the aqueous phase)
[3] Total, wet weight

Example 5

This Example is based on the formulation of Example 1, except that it comprises ca 8 wt % of organosilane-functionalised colloidal silica, based on the total weight of the formulation, and comprises correspondingly less added water in the mill base.

| Component | Commercial name | Weight (g) |
|---|---|---|
| Mill Base | | |
| Water | | 79.80 |
| Dispersant | Tamol ™ 851 | 1.60 |
| Dispersant | KTPP [1] | 1.40 |
| De-foamer | DAPRO ™ 7580 | 1.90 |
| Calcium carbonate | Snowhite ™ 10 | 394.11 |
| TiO$_2$ | Kronos ™ 2160 | 90.00 |
| Zinc oxide | Kadox ™ 915 | 20.00 |
| Let-Down | | |
| Binder-Latex (acrylic emulsion) | Rhoplex ™ EC-1791 | 477.00 |
| De-foamer | DAPRO ™ DF 7005 | 1.90 |
| Solvent (propanediol monoester) | DAPRO ™ FX 511 | 7.00 |
| Mildewcide (Fungicide) | Acticide ™ MBS | 2.10 |
| Mildewcide (Fungicide) | Acticide ™ MKW2 | 1.20 |
| Solvent (propylene glycol) | | 24.40 |
| Diisononyl phthalate (DINP) | Jayflex ™ DINP | 3.00 |
| 1,2-Cyclohexane dicarboxylic acid diisononyl ester | Hexamoll ™ DINCH | 35.00 |
| Functionalised Colloidal Silica [2] | Levasil ™ CC301 | 99.60 |
| Polymeric microspheres [3] | Expancel ™ 461WE20d36 | 0 |
| Methyl ethyl hydroxyethyl cellulose | Bermacoll ™ EBM 8000 | 4.20 |
| Total | | 1244 |
| Total Solid content(wt %) | 63.84% | |
| PVC | 43.1% | |

[1] Potassium tetrapyrophosphate
[2] Total colloidal silica weight (i.e. including the aqueous phase)
[3] Total, wet weight

Example 6

This Example is based on the formulation of Example 1, except that it comprises ca 10 wt % of organosilane-functionalised colloidal silica, based on the total weight of the formulation, and comprises correspondingly less added water in the mill base.

| Component | Commercial name | Weight (g) |
|---|---|---|
| Mill Base | | |
| Water | | 61.80 |
| Dispersant | Tamol ™ 851 | 1.60 |
| Dispersant | KTPP [1] | 1.40 |
| De-foamer | DAPRO ™ 7580 | 1.90 |
| Calcium carbonate | Snowhite ™ 10 | 387.51 |
| TiO$_2$ | Kronos ™ 2160 | 90.00 |
| Zinc oxide | Kadox ™ 915 | 20.00 |
| Let-Down | | |
| Binder-Latex (acrylic emulsion) | Rhoplex ™ EC-1791 | 479.00 |
| De-foamer | DAPRO ™ DF 7005 | 1.90 |
| Solvent (propanediol monoester) | DAPRO ™ FX 511 | 7.00 |
| Mildewcide (Fungicide) | Acticide ™ MBS | 2.10 |
| Mildewcide (Fungicide) | Acticide ™ MKW2 | 1.20 |
| Solvent (propylene glycol) | | 24.40 |
| Diisononyl phthalate (DINP) | Jayflex ™ DINP | 3.00 |
| 1,2-Cyclohexane dicarboxylic acid diisononyl ester | Hexamoll ™ DINCH | 35.00 |
| Functionalised Colloidal Silica [2] | Levasil ™ CC301 | 124.80 |
| Polymeric microspheres [3] | Expancel ™ 461WE20d36 | 0 |
| Methyl ethyl hydroxyethyl cellulose | Bermacoll ™ EBM 8000 | 4.20 |
| Total | | 1247 |
| Total Solid content(wt-%) | 63.84% | |
| PVC | 43.1% | |

[1] Potassium tetrapyrophosphate
[2] Total colloidal silica weight (i.e. including the aqueous phase)
[3] Total, wet weight

Example 7

This Example is based on the formulation of Example 1, except that it comprises ca 12 wt % of organosilane-functionalised colloidal silica, based on the total weight of the formulation, and comprises correspondingly less added water in the mill base.

| Component | Commercial name | Weight (g) |
|---|---|---|
| Mill Base | | |
| Water | | 43.80 |
| Dispersant | Tamol ™ 851 | 1.60 |
| Dispersant | KTPP [1] | 1.40 |
| De-foamer | DAPRO ™ 7580 | 1.90 |
| Calcium carbonate | Snowhite ™ 10 | 380.60 |
| TiO$_2$ | Kronos ™ 2160 | 90.00 |
| Zinc oxide | Kadox ™ 915 | 20.00 |
| Let-Down | | |
| Binder-Latex (acrylic emulsion) | Rhoplex ™ EC-1791 | 480.00 |
| De-foamer | DAPRO ™ DF 7005 | 1.90 |
| Solvent (propanediol monoester) | DAPRO ™ FX 511 | 7.00 |
| Mildewcide (Fungicide) | Acticide ™ MBS | 2.10 |
| Mildewcide (Fungicide) | Acticide ™ MKW2 | 1.20 |
| Solvent (propylene glycol) | | 24.40 |

| Component | Commercial name | Weight (g) |
|---|---|---|
| Diisononyl phthalate (DINP) | Jayflex ™ DINP | 3.00 |
| 1,2-Cyclohexane dicarboxylic acid diisononyl ester | Hexamoll ™ DINCH | 35.00 |
| Functionalised Colloidal Silica [2] | Levasil ™ CC301 | 150.00 |
| Polymeric microspheres [3] | Expancel ™ 461WE20d36 | 0 |
| Methyl ethyl hydroxyethyl cellulose | Bermacoll ™ EBM 8000 | 4.20 |
| Total | | 1248 |
| Total Solid content(wt-%) | | 63.83% |
| PVC | | 43.1% |

[1] Potassium tetrapyrophosphate
[2] Total colloidal silica weight (i.e. including the aqueous phase)
[3] Total, wet weight

Example 8

This Example is based on the formulation of Example 2, except that it comprises ca 7 wt % of organosilane-functionalised colloidal silica, based on the total weight of the formulation, and used a correspondingly lower amount of water in the mill base. The mass of colloidal silica used is the same as that used in Example 4.

| Component | Commercial name | Weight (g) |
|---|---|---|
| Mill Base | | |
| | Water | 82.76 |
| Dispersant | Tamol ™ 851 | 1.60 |
| Dispersant | KTPP [1] | 1.40 |
| De-foamer | DAPRO ™ 7580 | 1.90 |
| Calcium carbonate | Snowhite ™ 10 | 190.28 |
| TiO2 | Kronos ™ 2160 | 90.00 |
| Zinc oxide | Kadox ™ 915 | 20.00 |
| Let-Down | | |
| Binder-Latex (acrylic emulsion) | Rhoplex ™ EC-1791 | 475.00 |
| De-foamer | DAPRO ™ DF 7005 | 1.90 |
| Solvent (propanediol monoester) | DAPRO ™ FX 511 | 7.00 |
| Mildewcide (Fungicide) | Acticide ™ MBS | 2.10 |
| Mildewcide (Fungicide) | Acticide ™ MKW2 | 1.20 |
| Solvent (propylene glycol) | | 24.40 |
| Diisononyl phthalate (DINP) | Jayflex ™ DINP | 3.00 |
| 1,2-Cyclohexane dicarboxylic acid diisononyl ester | Hexamoll ™ DINCH | 35.00 |
| Functionalised Colloidal Silica [2] | Levasil ™ CC301 | 74.62 |
| Polymeric microspheres [3] | Expancel ™ 461WE20d36 | 18.70 |
| Methyl ethyl hydroxyethyl cellulose | Bermacoll ™ EBM 8000 | 4.20 |
| Total | | 1035 |
| Total Solid content(wt-%) | | 56.54% |
| PVC | | 43.1% |

[1] Potassium tetrapyrophosphate
[2] Total colloidal silica weight (i.e. including the aqueous phase)
[3] Total, wet weight

Example 9

This Example is based on the formulation of Example 2, except that it comprises ca 10 wt % of organosilane-functionalised colloidal silica, based on the total weight of the formulation, and used a correspondingly lower amount of water in the mill base. The mass of colloidal silica used is the same as that used in Example 5.

| Component | Commercial name | Weight (g) |
|---|---|---|
| Mill Base | | |
| | Water | 64.76 |
| Dispersant | Tamol ™ 851 | 1.60 |
| Dispersant | KTPP [1] | 1.40 |
| De-foamer | DAPRO ™ 7580 | 1.90 |
| Calcium carbonate | Snowhite ™ 10 | 183.35 |
| TiO2 | Kronos ™ 2160 | 90.00 |
| Zinc oxide | Kadox ™ 915 | 20.00 |
| Let-Down | | |
| Binder-Latex (acrylic emulsion) | Rhoplex ™ EC-1791 | 477.00 |
| De-foamer | DAPRO ™ DF 7005 | 1.90 |
| Solvent (propanediol monoester) | DAPRO ™ FX 511 | 7.00 |
| Mildewcide (Fungicide) | Acticide ™ MBS | 2.10 |
| Mildewcide (Fungicide) | Acticide ™ MKW2 | 1.20 |
| Solvent (propylene glycol) | | 24.40 |
| Diisononyl phthalate (DINP) | Jayflex ™ DINP | 3.00 |
| 1,2-Cyclohexane dicarboxylic acid diisononyl ester | Hexamoll ™ DINCH | 35.00 |
| Functionalised Colloidal Silica [2] | Levasil ™ CC301 | 99.60 |
| Polymeric microspheres [3] | Expancel ™ 461WE20d36 | 18.70 |
| Methyl ethyl hydroxyethyl cellulose | Bermacoll ™ EBM 8000 | 4.20 |
| Total | | 1037 |
| Total Solid content(wt-%) | | 56.54% |
| PVC | | 43.1% |

[1] Potassium tetrapyrophosphate
[2] Total colloidal silica weight (i.e. including the aqueous phase)
[3] Total, wet weight

Example 10

This Example is based on the formulation of Example 2, except that it comprises ca 12 wt % of organosilane-functionalised colloidal silica, based on the total weight of the formulation, and used a correspondingly lower amount of water in the mill base. The mass of colloidal silica used is the same as that used in Example 6.

| Component | Commercial name | Weight (g) |
|---|---|---|
| Mill-base | | |
| | Water | 46.66 |
| Dispersant | Tamol ™ 851 | 1.60 |
| Dispersant | KTPP [1] | 1.40 |
| De-foamer | DAPRO ™ 7580 | 1.90 |
| Calcium carbonate | Snowhite ™ 10 | 176.42 |
| TiO2 | Kronos ™ 2160 | 90.00 |
| Zinc oxide | Kadox ™ 915 | 20.00 |
| Let-Down | | |
| Binder-Latex (acrylic emulsion) | Rhoplex ™ EC-1791 | 479.00 |
| De-foamer | DAPRO ™ DF 7005 | 1.90 |
| Solvent (propanediol monoester) | DAPRO ™ FX 511 | 7.00 |
| Mildewcide (Fungicide) | Acticide ™ MBS | 2.10 |
| Mildewcide (Fungicide) | Acticide ™ MKW2 | 1.20 |
| Solvent (propylene glycol) | | 24.40 |

-continued

| Component | Commercial name | Weight (g) |
|---|---|---|
| Diisononyl phthalate (DINP) | Jayflex ™ DINP | 3.00 |
| 1,2-Cyclohexane dicarboxylic acid diisononyl ester | Hexamoll ™ DINCH | 35.00 |
| Functionalised Colloidal Silica [2] | Levasil ™ CC301 | 124.80 |
| Polymeric microspheres [3] | Expancel ™ 461WE20d36 | 18.70 |
| Methyl ethyl hydroxyethyl cellulose | Bermacoll ™ EBM 8000 | 4.20 |
| Total | | 1039 |
| Total Solid content(wt-%) | 56.54% | |
| PVC | 43.1% | |

[1] Potassium tetrapyrophosphate
[2] Total colloidal silica weight (i.e. including the aqueous phase)
[3] Total, wet weight Experiments In the experiments below, reference to an initial or fresh coating mean a coating that, after its initial wet application, has been allowed to dry for 14 days at 23° C. and at 50% relative humidity. Aged samples refer to samples aged for a further 1000 h under the conditions set out in Experiment 3 below.

Experiment 1—Dynamic Viscosity

Dynamic viscosities of the compositions were measured, according to ASTM D2196 (at 25° C.), using a rotational (Brookfield type) viscometer. Results are listed in Table 1.

TABLE 1

Dynamic Viscosity Measurements

| Example | Viscosity (Pa · s) Brookfield/spindle 4/6 rpm |
|---|---|
| 1 | 32.97 |
| 2 | 18.53 |
| 3 | 17.3 |
| 4 | 22.23 |
| 5 | 22.37 |
| 6 | 22.37 |
| 7 | 16.27 |
| 8 | 27.6 |
| 9 | 22.17 |
| 10 | 17.7 |

The requirement for acrylic coatings for use in roofing (according to ASTM D6083) is for a dynamic viscosity of about 12 to 85 Pa s. Therefore, the microsphere and/or organosilane functionalised colloidal silica modified coating compositions have viscosities that are suitable for use in building coatings.

Experiment 2—Stability

The dynamic viscosity of the coating composition was measured initially, and also after 1 month storage at room temperature. A separate sample was also kept at 50° C. for 1 month, before its dynamic viscosity was also measured. Results are shown in Table 2. Viscosities were measured using the same ASTM 2196 method as described above, at a shear rate of 1 s$^{-1}$, and are expressed in units of Pa s. The figures in brackets show the percentage change compared to the initial value.

TABLE 2

Measurements of viscosity over time

| Example | Initial Viscosity | Viscosity after 1 month @50° C. | Viscosity after 1 month @Room Temperature |
|---|---|---|---|
| 1 | 34.39 | 45.97 (33.7%) | 39.58 (15.1%) |
| 2 | 18.33 | 18.88 (3.0%) | 18.66 (1.8%) |
| 3 | 17.58 | 17.21 (−2.1%) | 17.11 (−2.7%) |
| 4 | 22.72 | 23.85 (5.0%) | 23.00 (1.3%) |
| 5 | 21.19 | 23.38 (10.4%) | 23.56 (11.2%) |
| 6 | 22.84 | 26.73 (17.1%) | 23.84 (4.4%) |
| 7 | 17.07 | 19.91 (16.6%) | 18.46 (8.1%) |
| 8 | 28.73 | 29.69 (3.3%) | 29.83 (3.8%) |
| 9 | 21.76 | 22.82 (4.9%) | 22.29 (2.4%) |
| 10 | 20.71 | 21.47 (3.7%) | 20.67 (−0.2%) |

The results show that the modified samples show improved long-term stability compared to the composition comprising no microspheres or organosilane-functionalised colloidal silica.

Experiment 3—Accelerated Ageing Test

Samples were subjected to accelerated ageing conditions over 1000 hours, according to ISO 16474-2. Samples were initially applied to an aluminium substrate, and allowed to dry for 14 days at 23° C. and 50% relative humidity, at which point initial measurements were made using a Minolta CR-200 tristimulus colorimeter. They were then subjected to 1000 h accelerated ageing under a filtered xenon arc lamp in a Q-Sun Xe 3 HS weathering tester apparatus before being re-analysed. Results are shown in Table 3.

ΔE* represents the differences in the L*, a* and b* values before and after ageing according to the following equation:

$$\Delta E^* = \sqrt{\Delta L^{*2} + \Delta a^{*2} + \Delta b^{*2}}$$

The experiment demonstrates that the visual properties of the modified coating compositions do not degrade any quicker than the reference sample.

TABLE 3

Sun ageing test

| Example | Initial - D65/10° | | | Post ageing - D65/10° | | | |
|---|---|---|---|---|---|---|---|
| | L* | a* | b* | L* | a* | b* | ΔE* |
| 1 | 96.49 | −0.8 | 1.32 | 96.81 | −0.79 | 1.34 | 0.32 |
| 2 | 97.31 | −0.78 | 1.52 | 97.3 | −0.76 | 1.26 | 0.26 |
| 3 [1] | 98.03 | −0.75 | 1.85 | 98.01 | −0.73 | 1.13 | 0.72 |
| 4 | 96.97 | −0.79 | 1.32 | 96.52 | −0.77 | 1.35 | 0.45 |
| 5 | 96.81 | −0.82 | 1.15 | 96.59 | −0.75 | 1.3 | 0.28 |
| 6 | 96.67 | −0.83 | 1.24 | 96.4 | −0.79 | 1.31 | 0.28 |
| 7 | 96.82 | −0.84 | 1.2 | 96.87 | −0.78 | 1.59 | 0.40 |
| 8 | 97.75 | −0.78 | 1.8 | 97.36 | −0.75 | 1.27 | 0.66 |
| 9 | 97.48 | −0.81 | 1.38 | 97.71 | −0.72 | 1.24 | 0.28 |
| 10 | 97.34 | −0.82 | 1.42 | 97.38 | −0.74 | 1.26 | 0.18 |

[1] sample had a sticky texture before and after ageing

Experiment 4—Tensile Properties

Measurements were made on fresh and aged coatings. Coatings were formed by applying two coats at a 4 hour interval, to provide a dried film of 500±50 μm. The films were peeled off their substrates after 7 days, and allowed to rest on the substrate for the remainder of the drying and ageing process.

Elongation at break and tensile strength (maximum stress) were measured using method ASTM D2370. Measurements were made on films detached from the substrate, either directly or after 1000 h ageing under conditions described in Experiment 3. The dry film thickness was approximately 500 μm thickness, and was cut into pieces measuring 7.5× 1.3 cm before being tested.

The piece of cut film was clamped at each end, with a 25 mm distance between the clamps. The clamps were moved apart at a rate of 25±0.5 mm/min until the film tore. The point of maximum resistance to moving the clamps was also measured. The device used was an Instron™ 3355 universal test machine. The results are shown in Table 4.

These results demonstrate modification of a coating composition with organosilane-functionalised colloidal silica improves both the initial and long-term tensile strength, without any significant detriment to the elongation at break performance. For example, all the Examples according to the present disclosure achieve the ASTM D6308 requirement for an elongation at break value of 100% or higher.

TABLE 4

Strength and tensile properties

| | Initial | | | After 1000 h | | |
|---|---|---|---|---|---|---|
| Example | Young Modulus (MPa) | Elongation at break (%) | Max. Tensile strength (MPa) | Young Modulus (MPa) | Elongation at break (%) | Max. Tensile strength (MPa) |
| 1 | 3.61 | 230.56 | 0.89 | 2.80 | 190.59 | 1.10 |
| 2 | 1.45 | 267.40 | 0.67 | 1.94 | 278.25 | 1.10 |
| 3 | 1.09 | 222.06 | 0.55 | 0.98 | 258.51 | 0.86 |
| 4 | 5.10 | 232.18 | 1.26 | 7.67 | 175.31 | 1.50 |
| 5 | 5.97 | 216.52 | 1.31 | 10.22 | 173.62 | 1.66 |
| 6 | 7.02 | 221.27 | 1.37 | 4.24 | 211.64 | 1.38 |
| 7 | 22.05 | 161.14 | 1.63 | 26.59 | 115.73 | 2.04 |
| 8 | 2.64 | 224.15 | 0.94 | 9.60 | 185.16 | 1.64 |
| 9 | 3.16 | 220.70 | 0.93 | 4.12 | 199.90 | 1.29 |
| 10 | 4.24 | 207.60 | 1.04 | 3.86 | 205.39 | 1.16 |

Experiment 5—Tear Resistance

Using the same apparatus as Experiment 4, the tear resistance of an initially dried coating (500 μm thickness) was measured following test method ASTM D624. The clamps were moved apart at a rate of 500 mm/min. Results are shown in Table 5.

This experiment demonstrates that the organosilane functionalised colloidal silica imparts improved tear resistance to the coatings. The experiment also shows that the coatings comprising both microspheres and modified colloidal silica are no worse than the base material that comprises neither of these components.

TABLE 5

Tear Resistance Measurements

| Example | Tear resistance (kN m$^{-1}$) |
|---|---|
| 1 | 12.85 |
| 2 | 10.64 |
| 3 | 10.39 |
| 4 | 17.13 |
| 5 | 17.46 |
| 6 | 19.01 |
| 7 | 18.46 |
| 8 | 12.63 |
| 9 | 12.82 |
| 10 | 12.24 |

Experiment 6—Low Temperature Flexibility

The flexibility of coatings on an aluminium substrate was measured using a conical mandrel bend test, according to ASTM D522. The film thickness was approximately 360 μm. After application, they were allowed to dry for 72 h at 23° C. and 50% relative humidity, followed by ageing under the conditions described in Experiment 3.

After ageing, and before measurements were made, the samples were conditioned for 120 h at 50° C. and 50% relative humidity, followed by 1 day at −26° C. In the test, the coated substrate is bent over a series of mandrels of decreasing diameter. The result is based on the lowest mandrel diameter at which no cracks are visible. Results are shown in Table 6.

For ASTM D6308, a value of 13 mm or better is required. All samples tested met this requirement, showing that the low temperature flexibility properties of the coating are not negatively affected by the use of the organofunctionalised silane-modified colloidal silica or the microspheres.

TABLE 6

Conical mandrel low temperature flexibility tests

| Example | ASTM D522 | Dry film thickness/variation (μm) | | |
|---|---|---|---|---|
| 1 | pass 13 mm | 340/6.0 | 341/4.7 | 337/4.9 |
| 2 | pass 13 mm | 326/12.7 | 324/4.2 | 329/7.8 |
| 3 | pass 13 mm | 356/3.3 | 381/7.6 | 380/3.5 |
| 4 | pass 13 mm | 310/4.3 | 326/3.5 | 309/2.6 |
| 5 | pass 13 mm | 366/6.4 | 372/2.0 | 365/2.3 |
| 6 | pass 13 mm | 347/5.4 | 344/7.5 | 336/2.6 |
| 7 | pass 13 mm | 391/2.4 | 382/6.8 | — |
| 8 | pass 13 mm | 359/3.3 | 360/3.2 | — |
| 9 | pass 13 mm | 389/2.3 | 392/2.1 | — |
| 10 | pass 13 mm | 343/1.3 | 349/3.4 | — |

Experiment 7—Dirt Pick-Up Resistance

Coated aluminium substrates were soiled by employing iron oxide and carbon black water based pastes. Those pastes contain only water and the carbon black/iron oxide pigment without any other additives. The concentrated soiling pastes are put on the surface to be characterised and allowed to dry for 24 h. The dried cakes are firstly removed under running water with a soft towel. In a second step, the surface is also washed with a soft towel with water and soap, in order to simulate rain and cleaning. Trichromatic coordinates (L*,a*,b*) are measured initially and after soiling and washing of the paint surfaces, using the tristimulus colorimeter set out above in Experiment 3. The total colour change value, ΔE* (see above), between the "cleaned" and the "pre-soiled" coating is then calculated. Low ΔE* values correspond to high dirt pick-up resistance.

Resistance to adherence was measured for fresh coatings (after 1 month of drying at room temperature) and for samples aged for a further 1000 h in the way set out in Experiment 3. Results are listed in Table 7.

The results show that modification of the coating with microspheres and/or organofunctionalised colloidal silica improves resistance to adherence of hydrophobic and hydrophilic materials (exemplified by carbon black and iron oxide). The long term effects are particularly improved in the case of coating compositions modified with both microspheres and organomodified colloidal silica.

TABLE 7

Dirt pick-up resistance measurements

| | Colour[1] - SCI/D65/10° | | | Carbon black | | Red Iron oxide | |
|---|---|---|---|---|---|---|---|
| Example | L* | a* | b* | ΔE* - water | ΔE* - soap | ΔE* - water | ΔE* - soap |
| Initial | | | | | | | |
| 1 | 96.03 | −0.69 | 1.93 | 46.83 | 36.87 | 14.14 | 8.10 |
| 2 | 97.16 | −0.70 | 2.17 | 53.39 | 47.14 | 15.84 | 12.73 |
| 3 | 97.47 | −0.71 | 2.29 | 36.48 | 33.29 | 14.48 | 11.16 |
| 4 | 96.52 | −0.72 | 1.74 | 9.89 | 3.54 | 1.65 | 0.80 |
| 5 | 96.32 | −0.70 | 1.86 | 10.22 | 1.38 | 0.27 | 0.33 |
| 6 | 96.26 | −0.71 | 1.86 | 9.38 | 1.42 | 0.78 | 0.17 |
| 7 | 96.62 | −0.70 | 2.00 | 1.05 | 2.73 | 0.63 | 0.37 |
| 8 | 97.31 | −0.71 | 2.20 | 19.91 | 1.73 | 4.04 | 1.52 |
| 9 | 97.39 | −0.70 | 2.24 | 8.23 | 1.71 | 3.14 | 1.22 |
| 10 | 97.12 | −0.73 | 2.23 | 0.66 | 1.22 | 2.01 | 0.22 |
| Aged | | | | | | | |
| 1 | 96.01 | −0.63 | 1.87 | 40.25 | 12.19 | 13.29 | 5.54 |
| 2 | 96.80 | −0.61 | 1.60 | 37.74 | 16.78 | 10.32 | 4.61 |
| 3 | 97.18 | −0.54 | 1.60 | 35.32 | 18.96 | 1.75 | 0.50 |
| 4 | 96.29 | −0.64 | 1.66 | 27.89 | 18.35 | 6.50 | 3.78 |
| 5 | 96.46 | −0.62 | 1.56 | 24.26 | 11.98 | 6.82 | 1.21 |
| 6 | 95.78 | −0.66 | 1.65 | 21.11 | 8.76 | 10.98 | 3.65 |
| 7 | 96.42 | −0.66 | 1.83 | 23.71 | 10.64 | 6.13 | 2.18 |
| 8 | 96.84 | −0.6 | 1.63 | 22.06 | 7.40 | 2.45 | 0.51 |
| 9 | 97.07 | −0.58 | 1.61 | 18.63 | 5.46 | 6.99 | 0.58 |
| 10 | 96.60 | −0.60 | 1.64 | 18.38 | 5.07 | 6.42 | 1.40 |

[1]Colour properties of unsoiled coating

The overall long term change in reflectance (less than 1%) upon ageing is very low compared, for example, to the maximum allowed reduction in reflectance of 20%, as set out in Mexican standard NMX-U-125-SCFI-2016, for example.

Experiment 8—Total Solar Reflectance

Reflectance of wavelengths over the range of about 280 to 2500 nm were measured on aluminium-coated substrates, one month after drying at room temperature and 50% humidity, and also on coated substrates aged for a further 1000 h as described above in Experiment 3. The ASTM E903 test method was used, with ASTM G173 reference. The apparatus used was an Agilent Cary 5000 UV-visible spectrometer.

Results are shown in Table 8, with reflectance values in %. Dry film thicknesses were in the range of 236-340 μm.

TABLE 8

Reflectance properties of initially applied and aged coatings

| | Film Thickness(μm) | Reflection 280-2500 nm | | Reflection 280-400 nm (UV) | | Reflection 400-750 nm (Vis) | | Reflection 750-2500 nm (IR) | |
|---|---|---|---|---|---|---|---|---|---|
| Example | Initial/aged | Initial | Aged | Initial | Aged | Initial | Aged | Initial | Aged |
| 1 | 236/297 | 82.67 | 84.08 | 11.18 | 11.82 | 89.70 | 90.56 | 82.29 | 84.37 |
| 2 | 248/256 | 85.25 | 85.64 | 10.93 | 11.81 | 91.68 | 91.74 | 85.80 | 86.50 |
| 3 | 291/220 | 87.59 | 87.53 | 11.19 | 11.68 | 93.48 | 93.46 | 88.93 | 88.76 |
| 4 | 283/283 | 83.72 | 83.72 | 11.32 | 11.32 | 90.88 | 90.88 | 83.29 | 83.29 |
| 5 | 234/307 | 83.08 | 83.44 | 11.27 | 10.95 | 90.48 | 90.07 | 82.33 | 83.58 |
| 6 | 236/256 | 82.85 | 82.81 | 10.90 | 10.67 | 90.12 | 89.57 | 82.27 | 82.78 |
| 7 | 228/340 | 83.12 | 84.24 | 10.99 | 11.19 | 90.47 | 90.73 | 82.46 | 84.59 |
| 8 | 237/260 | 85.38 | 85.71 | 11.46 | 11.35 | 91.94 | 91.91 | 85.76 | 86.51 |
| 9 | 232/297 | 86.52 | 86.31 | 11.18 | 11.27 | 92.78 | 92.79 | 87.35 | 86.88 |
| 10 | 236/264 | 85.09 | 86.54 | 11.09 | 11.02 | 91.74 | 91.97 | 85.38 | 86.33 |

These results demonstrate that modification with microspheres and/or organosilane-functionalised colloidal silica improves reflectance properties of the coating over extended periods of time, particularly over the visible, infra-red and near infra-red regions of the spectrum.

Experiment 9—Water Vapour Permeability

Water vapour permeability tests according to ASTM D1653 were obtained on free films (i.e. after removal from substrate) of freshly dried coatings, i.e. after 14 days drying at 23° C./50% relative humidity. Results are shown in Table 9.

Perms values were measured in metric units, and the US perms values were calculated using a conversion factor of 1.51735. The results show that the water vapour permeation properties of the modified coatings are suitable for use in cool roof applications, since the ASTM D6083 requirements are for a water vapour permeability of no more than 50 US perms. For reference, high perms values relate to high water vapour permeability.

TABLE 9

Water vapour permeability

| Example | Metric Perms | US Perms | Dry Film Thickness (μm) |
|---|---|---|---|
| 1 | 5.97 | 9.06 | 530.2 |
| 2 | 6.24 | 9.47 | 461.2 |
| 3 | 7.87 | 11.94 | 466.4 |
| 4 | 21.67 | 32.88 | 457.6 |
| 5 | 30.08 | 45.64 | 432.2 |
| 6 | 30.86 | 46.83 | 450.6 |
| 7 | 46.85 | 71.09 | 505 |
| 8 | 11.48 | 17.42 | 473.4 |
| 9 | 13.06 | 19.82 | 495.2 |
| 10 | 19.95 | 30.27 | 489.4 |

It is of note that the vapour permeability increases when either microspheres or organosilane-functionalised colloidal silica is used. However, when both are used, this increase is not accumulated, and instead the combination improves (reduces) permeability compared to the functionalised colloidal silica alone. This is unexpected.

Experiment 10—Adherence

Wet and dry adherence tests were made according to test methods ASTM D903 and ASTM C794. A coating was applied by brush to a galvanised steel substrate. A 2.5 cm wide strip of cloth was then placed on top, and another coating layer subsequently applied. Drying time was 14 days at 23° C./50% relative humidity. Total coating thickness was ca 500 μm.

For the dry adhesion test, the strip was pulled backwards at a 180° angle at a traction rate of 50 mm/min, and the force required to do so was measured.

The wet adhesion test was carried out similarly, but after the sample had been immersed in tap water for 168 hours at ambient temperature.

Results are shown in Table 10.

TABLE 10

Adherence tests

| Example | Adherence (dry) N/m | Adherence (wet) N/m |
|---|---|---|
| 1 | 752.80 | 256 |
| 2 | 676.80 | 388 |
| 3 | 1044.40 | 603.6 |
| 4 | 779.60 | 500 |
| 5 | 889.60 | 878.4 |
| 6 | 904.00 | 841.6 |
| 7 | 968.40 | 948 |
| 8 | 732.40 | 632 |
| 9 | 751.60 | 937.6 |
| 10 | 811.20 | 810.8 |

Improvements in wet and dry adherence, particularly wet adherence, can be seen when using compositions comprising organosilane-functionalised colloidal silica and/or microspheres.

Experiment 11—Water Swelling Tests

Uptake of water into free-films of the freshly dried coatings (14 days at 23° C./50% relative humidity) was measured using test ASTM D471. Results are shown in Table 11.

These tests show that the water uptake properties of the modified coating compositions are still acceptable for use as external coatings, e.g. cool roof coatings, as the ASTM D6083 requirements are for a maximum of 20 wt % water uptake.

TABLE 11

Results of water swelling tests

| Example | Thickness (μm) | Initial weight (g) | Final weight (g) | Δ (%) |
|---|---|---|---|---|
| 1 | 496 | 0.8377 | 0.924 | 10.30 |
|   | 522 | 0.8564 | 0.9565 | 11.69 |
|   | 558 | 0.9103 | 1.016 | 11.61 |
|   |     |        |       | Average: 11.20 |
| 2 | 454 | 0.5339 | 0.6479 | 21.35 |
|   | 446 | 0.5278 | 0.6427 | 21.77 |
|   | 418 | 0.5171 | 0.6446 | 24.66 |
|   |     |        |       | Average: 22.59 |
| 3 | 444 | 0.3483 | 0.5057 | 45.19 |
|   | 446 | 0.3487 | 0.5023 | 44.05 |
|   | 425 | 0.3279 | 0.5347 | 63.07 |
|   |     |        |       | Average: 50.77 |
| 4 | 466 | 0.7414 | 0.8318 | 12.19 |
|   | 478 | 0.7704 | 0.8701 | 12.94 |
|   | 408 | 0.6713 | 0.7612 | 13.39 |
|   |     |        |       | Average: 12.84 |
| 5 | 438 | 0.7002 | 0.7988 | 14.08 |
|   | 420 | 0.6724 | 0.7687 | 14.32 |
|   | 414 | 0.6611 | 0.7523 | 13.80 |
|   |     |        |       | Average: 14.07 |
| 6 | 406 | 0.6236 | 0.7175 | 15.06 |
|   | 448 | 0.7025 | 0.8155 | 16.09 |
|   | 431 | 0.6889 | 0.7997 | 16.08 |
|   |     |        |       | Average: 15.74 |
| 7 | 480 | 0.7725 | 0.8908 | 15.31 |
|   | 506 | 0.8084 | 0.9325 | 15.35 |
|   | 496 | 0.8058 | 0.9293 | 15.33 |
|   |     |        |       | Average: 15.33 |
| 8 | 516 | 0.5947 | 0.6911 | 16.21 |
|   | 481 | 0.5642 | 0.6632 | 17.55 |
|   | 504 | 0.594  | 0.6886 | 15.93 |
|   |     |        |       | Average: 16.56 |
| 9 | 478 | 0.5599 | 0.6642 | 18.63 |
|   | 498 | 0.5799 | 0.6896 | 18.92 |
|   | 504 | 0.5915 | 0.7008 | 18.48 |
|   |     |        |       | Average: 18.67 |

TABLE 11-continued

Results of water swelling tests

| Example | Thickness (μm) | Initial weight (g) | Final weight (g) | Δ (%) |
|---|---|---|---|---|
| 10 | 491 | 0.564 | 0.6719 | 19.13 |
|  | 468 | 0.5359 | 0.6376 | 18.98 |
|  | 476 | 0.5387 | 0.6372 | 18.28 |
|  |  |  |  | Average: 18.80 |

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. A coating composition comprising an organosilane-functionalised colloidal silica as an aqueous colloid and hollow microspheres, wherein the organosilane-functionalised colloidal silica comprises silica particles with one or more epoxy-silane moieties bound to their surface and having a degree of modification of from about 1 to about 2 molecules of silane per $nm^2$, wherein the hollow microspheres comprise a polymeric shell,
   wherein the colloidal silica as an aqueous colloid is present in an amount of from about 7 to about 12 weight percent based on a total weight of the coating composition;
   wherein the surface area of the silica particles in the organosilane-functionalised colloidal silica is of from about 20 to about 1500 $m^2$ $g^{-1}$;
   wherein the hollow microspheres are expandable or expanded polymeric microspheres enclosing one or more volatile fluids;
   wherein a volume mean diameter of the hollow microspheres is of from about 1 to about 500 μm; and
   wherein the polymeric shell is a thermoplastic polymer shell and/or comprises a nitrile-containing monomer.

2. The coating composition according to claim 1, which is a solar reflective coating composition or cool roof coating composition.

3. The coating composition according to claim 1, in which one or more of the following conditions apply:
   a. the coating composition is aqueous, and comprises no more than about 30 wt % organic solvent;
   b. the coating composition comprises one or more organic binders which comprise at least one resin or polymer;
   c. the coating composition comprises one or more organic binders selected from natural and synthetic latices comprising at least one resin or polymer.

4. The coating composition according to claim 3, in which one or more of the following conditions apply:
   a. the surface area of the silica particles in the organosilane-functionalised colloidal silica is of from about 70 to about 600 $m^2$ $g^{-1}$;
   b. the volume mean diameter of the microspheres is of from about 3 to about 200 μm;
   c. the organic binder comprises an acrylic and/or polyurethane binder;
   d. the coating composition forms an elastomeric coating when dry;
   e. the $T_g$ of at least one resin or polymer in the organic binder is less than about 0° C.

5. The coating composition according to claim 1, wherein the coating composition is an elastomeric coating composition.

6. A substrate coated with a coating composition according to claim 1.

7. The substrate as claimed in claim 6, in which the coating composition is dried.

8. A method of making a coating composition, comprising mixing an organosilane-functionalised colloidal silica, hollow microspheres and optionally one or more organic binders and/or pigments, wherein the coating composition is as defined in claim 1.

9. The method of claim 8, in which the organosilane-functionalised colloidal silica comprises less than about 10 wt % organic solvent.

10. The coating composition according to claim 2, in which one or more of the following conditions apply:
    a. the coating composition is aqueous, and comprises no more than about 30 wt % organic solvent;
    b. the coating composition comprises one or more organic binders which comprise at least one resin or polymer;
    c. the coating composition comprises one or more organic binders selected from natural and synthetic latices comprising at least one resin or polymer.

11. The coating composition according to claim 10 wherein the the surface area of the silica particles is of from about 50 to about 900 $m^2$ $g^{-1}$.

12. The coating composition according to claim 10, in which one or more of the following conditions apply:
    a. the surface area of the silica particles is of from about 70 to about 600 $m^2$ $g^{-1}$;
    b. the volume mean diameter of the microspheres is of from about 3 to about 200 μm;
    c. the organic binder comprises an acrylic and/or polyurethane binder;
    d. the coating composition forms an elastomeric coating when dry;
    e. the $T_g$ of at least one resin or polymer in the organic binder is less than about 0° C.

13. The coating composition according to claim 12 wherein the surface area of the silica particles in the organosilane-functionalised colloidal silica is of from about 150 to about 500 $m^2$ $g^{-1}$.

14. The coating composition according to claim 13 wherein the $T_g$ of at least one resin or polymer in the organic binder is less than about −20° C.

15. The coating composition according to claim 12 wherein the $T_g$ of at least one resin or polymer in the organic binder is less than about −20° C.

16. The coating composition according to claim 10, wherein the coating composition is an elastomeric coating composition.

17. The coating composition according to claim 14, wherein the coating composition is an elastomeric coating composition.

18. The coating composition according to claim 1 wherein the polymeric shell comprises a copolymer of acrylonitrile, methyl methacrylate, and vinylidene chloride.

19. The coating composition according to claim 18 wherein the one or more volatile fluids comprises isobutane and the hollow microspheres are present in an amount of about 0.05 to about 5 weight percent based on a total weight of the composition.

20. The coating composition according to claim 1 wherein the one or more volatile fluids comprises isobutane and the hollow microspheres are present in an amount of about 0.05 to about 5 weight percent based on a total weight of the composition.

* * * * *